United States Patent [19]

Giehler et al.

[11] 4,110,389
[45] Aug. 29, 1978

[54] METHOD AND APARATUS FOR ROTATIONAL MOLDING WITH EVACUATED GUARD CHAMBER IN MOLD FLANGES

[75] Inventors: Herbert Giehler, Dautphe-Willhelmshütte; Wilfried Grau, Wolfgruben, both of Fed. Rep. of Germany

[73] Assignee: Elkamet/Lahn Kunststoff GmbH/Werk, Biedenkopf, Fed. Rep. of Germany

[21] Appl. No.: 703,204

[22] Filed: Jul. 7, 1976

[30] Foreign Application Priority Data

Jul. 7, 1975 [DE] Fed. Rep. of Germany ....... 2530211

[51] Int. Cl.² .................... B29C 5/04; B29D 23/08
[52] U.S. Cl. ......................... 264/89; 264/102; 264/126; 264/310; 425/429; 425/812
[58] Field of Search ............. 264/85, 101, 102, 310, 264/311, 126, 89; 425/812, 435, 429; 165/2, 61

[56] References Cited

U.S. PATENT DOCUMENTS

| | | | |
|---|---|---|---|
| 2,441,097 | 5/1948 | Hicks | 425/DIG. 60 |
| 3,351,983 | 11/1967 | Grigull | 425/812 |
| 3,473,192 | 10/1969 | Martelli | 425/DIG. 60 |
| 3,514,508 | 5/1970 | Schott et al. | 264/85 |
| 3,683,062 | 8/1972 | Von Der Heide | 264/85 |
| 3,692,457 | 9/1972 | Pekor | 425/435 |
| 3,773,454 | 11/1973 | Horve et al. | 425/DIG. 60 |

*Primary Examiner*—Willard E. Hoag
*Attorney, Agent, or Firm*—Otto John Munz

[57] ABSTRACT

The apparatus comprises a double walled mould interior divided into two halves, a heat exchange exterior hollow envelope and a pressure-exchange compartment within the envelope surrounding the adjacent abutting surfaces of the rims of the two mould halves, heat-exchanges and pressure-exchanges producing means to rotate the apparatus on two axes, means to introduce a protective gas into the mould to avoid combustion of vapors and optional means cooperating between the heat-exchange and pressure-exchange means in the heating and cooling phases.

The method includes controls of pressure and heat-exchange steps during the heating and cooling stages to avoid formation of bubbles, deformities and combustions, particularly when transparent plastic materials difficult to mould are used.

20 Claims, 2 Drawing Figures

FIGURE 2.

A. PROVIDING A HOLLOW DOUBLE WALLED DIVIDED MOULD HAVING AN INTERIOR MOULD CAVITY AND AN EXTERIOR HEAT-AND PRESSURE EXCHANGE CHAMBER WITH A PLURALITY OF COMPONENT MOULD PARTS WITH MUTUALLY MATING ABUTTING SEALING SURFACES OF THE MOULD AND THE EXTERNAL CHAMBER

B. PLACING THERMOPLASTIC MATERIAL INTO THE MOULD

C. APPLYING HEAT TO THE MOULD DURING A HEATING PHASE

D. COOLING THE MOULD DURING A COOLING PHASE

E. ROTATING THE MOULD ABOUT EACH OF TWO AXES OF ROTATION DURING THE HEATING AND COOLING PHASES

F. SUBJECTING THE INTERIOR OF THE MOULD DURING THE HEATING PHASE TO A PRESSURE LOWER THAN THE PRESSURE OF THE EXTERIOR CHAMBER

G. INCREASING THE PRESSURE IN THE MOULD ON TRANSITION TO THE COOLING PHASE TO EQUAL THE PRESSURE IN THE EXTERIOR CHAMBER

H. MAINTAINING AT LEAST DURING A PERIOD EXTENDING FROM THE START OF THE HEATING PHASE TO THE END OF THE COOLING PHASE IN THE EXTERIOR CHAMBER BETWEEN THE SEALING SURFACES OF THE MOULD PARTS CONTINUOUSLY A LOWER EXTERNAL PRESSURE THAN THAT OCCURRING IN THE MOULD CAVITY

I. INTRODUCING A PROTECTIVE GAS INTO THE MOULD CAVITY AT THE OPENING OF THE MOULD CONTAINING THE FINISHED BODY ON TRANSITION TO THE COOLING PHASE TO EQUALIZE THE PRESSURE IN THE MOULD CAVITY WITH THE EXTERNAL PRESSURE

METHOD AND APPARATUS FOR ROTATIONAL MOLDING WITH EVACUATED GUARD CHAMBER IN MOLD FLANGES

FIELD OF THE INVENTION

The present invention relates to an apparatus for and a method of manufacture of hollow bodies of thermoplastic synthetic material. (Class 425.435).

DESCRIPTION OF THE PRIOR ART

Applicants' prior U.S. Pat. Nos. 3,824,061 of July 16, 1974 for DEVICE FOR MAKING HOLLOW BODIES FROM THERMOPLASTIC MATERIAL BY ROTAtION-MELTING and 3,891,370 of June 24, 1975 for APPARATUS FOR MAKING HOLLOW BODIES FROM THERMOPLASTIC MATERIALS BY ROTATION-MELTING are made of record.

U.S. Pat. No. 3,439,079 to F. C. McDowell of Apr. 16, 1969 discloses the manufacture of hollow bodies of thermoplastic synthetic material in a rotary melting process. In accordance with this process a mould having a cavity corresponding to the external shape of the desired hollow body is partly filled with fluid or friable thermoplastic synthetic material. Heat is applied to the mould while the latter is being rotated about two axes of rotation, the mould is subsequently allowed to cool and, after the mould has been opened, the moulded body is removed therefrom.

The rotary melting process such as disclosed in U.S. Pat. No. 3,439,079 dated Apr. 16, 1969 of F. C. McDowell makes it possible to manufacture hollow bodies of uniform wall thickness and free of stress by relatively simple means, even in a mould provided with a cavity of complex shapes.

In a variation of the process, plastisoles such as for example polyvinyl-chloride-pastes, polyefines such as polyethylene and polypropylene as well as polystyrol, polymethylmethacrylate and other equivalent materials have been utilized as moulding materials.

U.S. Pat. Nos. 3,525,098 of Aug. 18, 1970 and 3,578,066 of May 11, 1971 to Anton J. Vox employ equal pumping- and suction pressures of the heat-exchange fluids in the external chamber and vacuum in the mould cavity respectively, to avoid deformation of the inner wall of the mould. Thereby, an improvement of the surface of the moulded parts may often be attained and the formation of bubbles in the synthetic material may be reduced.

The problem of manufacturing hollow moulded components of crystal-clear, thoroughly molten walls of break-resistant material has, however, not yet been satisfactorily solved. Although polymethylmethacrylate may in principle be processed to provide crystal-clear, homogenously molten moulded components, it has been found in practice, that the thermal difference between the melting borderline represented by heating and by overheating resulting in decomposition of the synthetic material is so small that great difficulties arise in the processing.

In particular it has not so far been possible to ensure that the mould remains so tightly closeable as to be gas tight after frequently repeated use. An application of vacuum to the mould cavity gas leaks occur at the closure-faces of the mould parts which often lead to the production of moulded articles which are defective, such as having holes, oxydation phenomena and burns along the mould separating line.

It has been proposed to attempt to overcome such problems by maintaining a reduced pressure between the closure surfaces at the mould separating line during the cooling phase, while simultaneously introducing a protective gas into the mould under excess pressure of up to about one atmosphere. This, however, tends to push the molten material against and through the abutting mould separating surfaces.

An apparatus suitable for carrying out the process provides the flange on one mould half with a groove, which extends about parallel to the rim and forms an annular cavity between the two flanges and is connected by a pipe duct with a vacuum. This source of reduced pressure is connected by a pipe duct provided with a non-return valve to another pipe duct, which connects a vacuum pressure generator to the interior of the mould cavity through a universal rotary joint. The non-return valve is arranged to isolate the store of reduced pressure from the pipe duct which interconnects the mould cavity and the universal rotary joint.

However, it has been found, that after a prolonged use it no longer suffices only to store the once applied vacuum and to maintain it during the cooling phase but that it is often impossible to prevent bubble formation along the mould separating line with such an apparatus because the bubbles apparently have already been formed during the heating phase because of the defective sealing at the mould separating surfaces.

The objects of the invention are to provide an apparatus for and a method of manufacturing homogenous hollow bodies including such of complex shapes by rotation melting from thermoplastic materials including such that are transparent and difficult to mould, of a uniform wall thickness:
  free of stress;
  with perfectly moulded surfaces;
  free of bubbles, holes, oxydation phenomena and burns;
  are break-resistant; and
  free of gas leaks at the adjoining closure-faces of the mould halves during the heating phase of their manufacture.

This is accomplished by evacuating the mould during the heating phase below the pressure of the external chamber and maintaining between the sealing surfaces of the mould parts during the heat-exchange phases a lower pressure than that occurring in the mould cavity.

A method of manufacturing hollow bodies from thermoplastic material placed in a mould cavity defined by a hollow double walled mould split in halves having an interior mould cavity, an exterior heat-exchange chamber or jacket and a hollow pressure exchange housing adjacent the surfaces of the rims of the mould cavity surrounding the mould. The divided mould comprises a plurality of mould parts provided with mutually abutting surface portions defining closure means for the mould cavity and the hollow chamber.

The method comprises the steps of:
  applying the heat to the mould during a heating phase;
  then cooling the mould during a cooling phase;
  causing the mould to be rotated about each of two axes of rotation during the heating and the cooling phases;
  evacuating the interior of the mould cavity during the heating phase to a pressure lower than the external pressure of the exterior chamber;

causing the pressure in the mould cavity at least to approach the external pressure on transition to the cooling phase;

causing mould portions exterior of the cavity and immediately next adjacent the closure means to be maintained at least during a period extending from the start of the heating phase to the end of the cooling phase, at a pressure less than that occurring in the mould cavity during that period.

The apparatus for manufacturing hollow bodies from thermoplastic materials comprises:

a hollow double walled mould split in halves having an interim mould cavity; an exterior heat-exchange chamber, and a hollow pressure exchange housing adjacent the surfaces of the rims of the mould cavity surrounding the mould.

The mould has plurality of mould parts defining in assembly a mould cavity.

The interior mould and its surrounding exterior chamber are provided with mutually abutting surface portions which define closure means for them.

The apparatus has:

means for applying heat to the mould during a heating phase;

means for extracting heat from the mould during a cooling phase;

means for rotating the mould about each of two axes of rotation;

first vacuum means for reducing the pressure in the mould cavity during the heating phase to a level below the pressure of the exterior chamber;

pressure equalizing means in the mould cavity on transition to the cooling phase to at least approach the external pressure;

second vacuum means, operable independently of the first vacuum means, to maintain portions of the exterior chamber immediately adjacent to the closure means of the mould at least during a period extending from the start of the heating phase to the end of the cooling phase at a pressure lower than that occurring in the mould cavity during that period.

For a moulding apparatus, in which the mould is heatable by means of a hot liquid such as oil, a vacuum is provided for the chamber between the flanges of the mould halves, which comprises a steam generator, heated by the current of heating fluid for the mould and a tandem cylinder drive unit having one cylinder connected by a pipe duct to the steam generator, and a second cylinder connected by a further pipe duct to the exterior chamber between the flanges of the mould halves.

The above objects are accomplished most satisfactorily even when raw material, such as cellulose, acetate, cellulose butyrate and cellulose propionate are employed, which raw materials had to be avoided by the prior art because of inferior results in these respects.

Other objects and advantages of the invention will become apparent to those skilled in the art from the following description taken in conjunction with the appended drawings and claims.

BRIEF DESCRIPTION OF THE DRAWINGS

FIG. 2 is a block diagram of the method of the invention.

DESCRIPTION OF THE PREFERRED EMBODIMENTS

Figure 1:
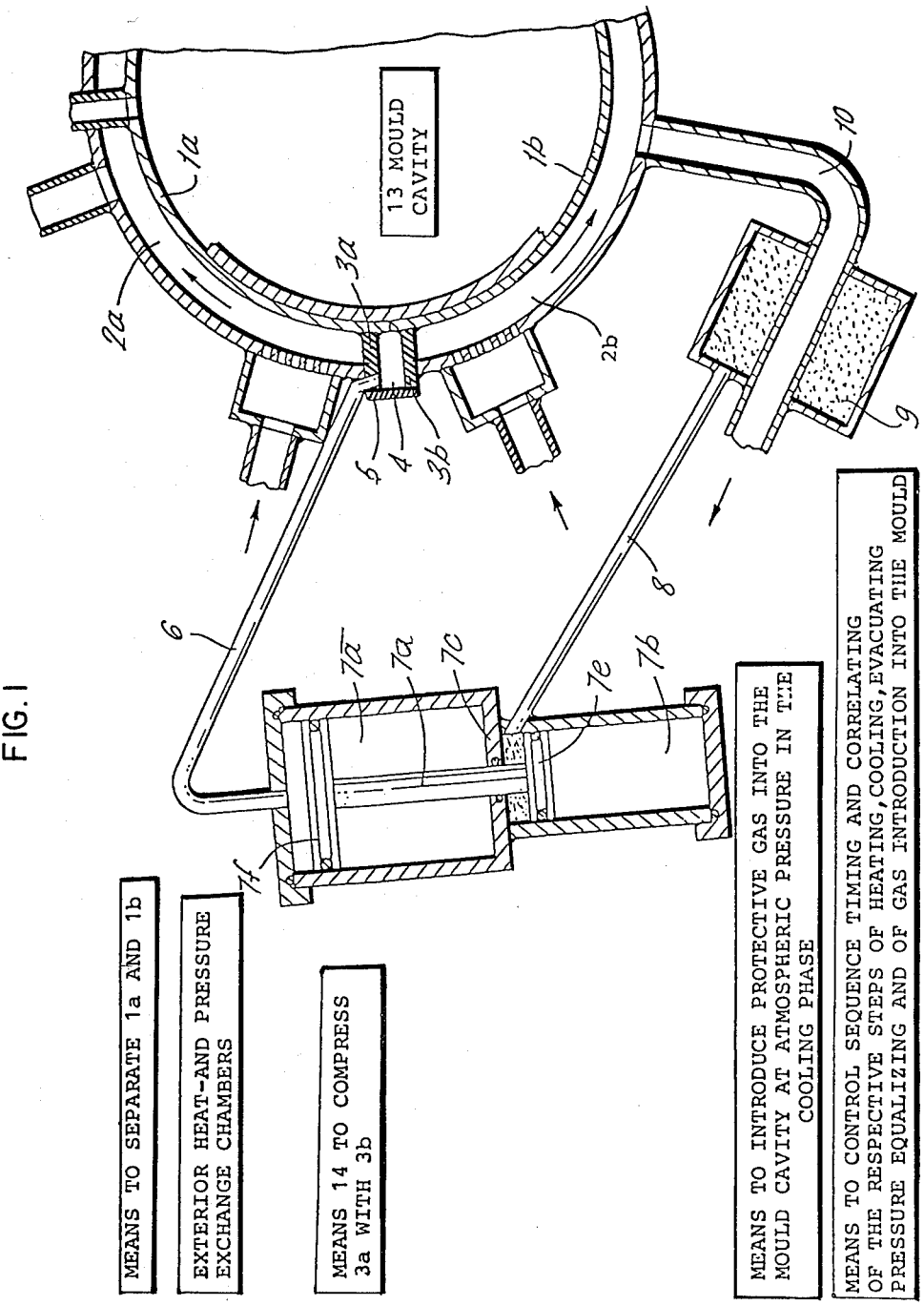
FIG. 1 is a partly sectional and partly diagrammatic view of the apparatus of the invention.

Referring now to the accompanying drawings, the apparatus comprises a two-part, double-walled mould in 1a and 1b.

A fluid heat exchange medium is introduced into chambers 2a and 2b between the walls of the mould halves 1a and 1b respectively. The heating fluid preferably comprises oil.

Thermoplastic material, preferably friable dry thermoplastic material is placed into the mould cavity 13 defined by the divided mould parts 1a and 1b.

The two mould halves 1a and 1b are connected to one another by means of flanges 3a and 3b, which fit onto one another and which are pressed together by conventional means 14, such as screw clamps. Inner rim portions of the respective flanges 3a and 3b are pressed tightly against one another and the respective rims are provided with cleanly ground surfaces for a mating contact with one another. The flanges 3a and 3b define between them and the inner rim portions a pressure-exchange hollow housing 4 which is closed by a sealing ring 5 of permanently elastic material, for example silicone rubber.

Duct means in the form of a pipe 6, connects the housing 4 to one cylinder 7a shown as the upper and larger cylinder of a tandem cylinder drive unit 7. A second cylinder 7b of the tandem cylinder drive unit 7 shown as the lower and smaller cylinder is connected by further duct means in the form of a pipe 8 with a steam generator 9.

In the preferred embodiment, the steam generator 9 comprises a shell casing surrounding a section of a return duct 10 for the fluid serving for the heating or cooling, respectively, of the chamber halves 1a and 1b. During a heating phase of the moulding process, the shell casing 9 receives heat energy required for steam generation from the heating oil passing along the duct 10.

The two cylinders 7a and 7b of the tandem cylinder drive unit 7 are arranged co-axially one behind the other and which are separated from one another by an end wall 7c. For claim purposes cylinder 7a is being defined as the larger cylinder and cylinder 7b as the smaller cylinder. The larger cylinder is provided with a piston 7f and the smaller cylinder with a piston 7e. The two pistons are interconnected by a common piston rod 7d.

The whole assembly including parts 1 through 10 is mounted in a mounting frame 11 and conventional means 12 are provided to rotate it simultaneously about two axes.

The mode of operation of this generator of reduced pressure is as follows:

From the start of the heating phase in the moulding process, the heating oil flowing back from the chamber 2b defined between the mould walls 1b passes through the steam generator 9, to cause there steam generation. This steam flows through the pipe duct 8 into the smaller steam cylinder and moves the piston 7e with the piston rod 7d. The piston 7f disposed in the larger cylinder at the other end of the piston rod 7d is moved simultaneously, whereby a vacuum is generated in the cylinder 7a and is communicated through the pipe duct 6 to the hollow housing or chamber 4.

Thus during the heating phase the chamber or space between the flanges 3a and 3b is evacuated.

During the cooling phase of the moulding process, the steam in the shell casing 9 condenses again to cause the piston 7e and 7f to move back to their initial positions, respectively, thus causing the pressure in the hollow housing 4 to revert to its initial higher value.

The mould is opened by separating the mould halves to introduce the plastic material therein, and again to remove the finished bodies therefrom.

Prior to the opening of the mould on transition to the cooling phase the vacuum is cancelled out by the introduction of a protective gas into the mould, thus increasing the pressure to equal the atmospheric pressure.

After completion of the heating phase of the process the interior of the manufactured body contains vapors originating from plastic softeners admixed to conventional cellulose derivatives used in the manufacture of the bodies. These vapors normally could explode on opening of the mould because of sudden access of outside oxygen thereto. The protective gas in addition to its function as a pressure balancing means also has the additional function to prevent the sudden entry of oxygen into the manufactured body and to purge it from the combustible vapors.

The protective gas may be selected among inert gases or gases which chemically react with the particular vapors of the softeners selected to make them non-combustible.

The housing or chamber 4 may be connected to any suitable generator of reduced pressure, which is independent of the generator of reduced pressure for the interior of the mould cavity 13. In some moulding apparatuses, the mould is not heated by fluid flowing between the double walls of the mould but by mounting the mould in a hot air chamber. In these circumstances, the reduced pressure may be generated quite independently of the moulding process.

While the process may be carried out manually optionally means are provided for the automatic control of the sequence and timing of the operations of said means to heat and to cool, of said sources of mould vacuum and of chamber vacuum and of said source of gas, first simultaneously to heat the mould and to evacuate the chamber and subsequently to cool the mould and to restore pressure to the chamber and to introduce the gas into the mould.

What I claim is:

1. In a method of rotationally moulding a hollow article from a hardenable moulding material, said method including the steps of heating and cooling said moulding material during rotation of said mould, the improvement comprising:
    A. providing a rotational mould having two mould halves defining a mould cavity therebetween, each of said mould halves having a jacket thereabout and spaced therefrom to define a jacket space; each of said mould halves having mating flanges extending therefrom; said flanges cooperating with a sealing member to define a pressure chamber therebetween;
    B. placig said moulding material in said mould cavity;
    C. passing a heating fluid through said jacket space to perform said heating step;
    D. passing a cooling fluid through said jacket to perform said cooling step;
    E. evacuating vapors from said mould cavity during said heating step;
    F. pressuring said mould cavity during said cooling step;
    G. continuously maintaining a pressure in said pressure chamber, during said heating and cooling at least as low as pressure in said mould cavity;
    H. passing said heating fluid leaving said jacket space through a steam generator, generating steam thereby, and
    I. actuating a vacuum means by said steam to perform said evacuating;
    J. passing said cooling fluid leaving said jacket through said steam generator and condensing steam in said steam generator, to reverse said vacuum means and raise pressure in said pressure chamber.

2. A method of manufacturing hollow bodies as claimed in claim 1, comprising the step of
    M. introducing a protective gas into the mould cavity at the opening of the mould containing the finished body on transition to the cooling phase to equalize the pressure in the mould cavity with the external pressure.

3. A method of manufacturing hollow bodies a claimed in claim 1, comprising the step of
    N. introducing a protective gas into the cavity of the finished body on opening of the mould to purge therefrom combustible vapors prior to entry therein of atmospheric oxygen.

4. A method of manufacturing hollow bodies as claimed in claim 1, said steps M and F comprising the step of
    H. providing said mould parts at their abutting sealing surfaces with airtight annular cavities and maintaining said cavities under vacuum.

5. A method as claimed in claim 1, further comprising the steps of:
    K. increasing the pressure in the mould cavity on transition to the cooling step to equal the pressure of the jacket.

6. A method as claimed in claim 1,
    L. wherein during said heating step the pressure in said pressure chamber is below atmospheric pressure.

7. A method of manufacturing hollow bodies as claimed in claim 1, from thermoplastic materials selected from a group consisting of:
    cellulose derivatives, polyvinyl-chloride, polyolefins, polyethylene, polypropylene, polystyrol and polymethacrylate.

8. An apparatus for rotationally moulding hollow articles from a hardenable moulding material including means for heating and cooling of said moulding material during rotation of said mould, the improvement comprising:
    A. a rotational mould having two mould halves defining a mould cavity therebetween, each of said mould halves having a jacket thereabout and spaced therefrom defining a jacket space; each of said mould halves having mating flanges extending therefrom; said flanges cooperating with a sealing member to define a pressure chamber therebetween;
    B. means to place said moulding material in said mould cavity;
    C. means to pass a heating fluid through said jacket spaces in said heating stage;
    D. means to pass a cooling fluid through said jacket in said cooling stage;
    E. means to evacuate vapors from said mould cavity during said heating stage;

F. means to control variably the pressure in said mould cavity and in said jacket;

G. means to maintain continuously a pressure in said pressure chamber, during said heating and cooling stages at least as low as the pressure in said mould cavity;

H. a steam generator;

I. means to pass said heating fluid leaving said jacket space through said steam generator to generate steam thereby; and J. to actuate a vacuum means by said steam to perform said evacuating;

K. means to pass said cooling fluid leaving said jacket through said steam generator and condensing steam in said steam generator, to reverse said vacuum means and raise pressure in said pressure chamber;

L. a pressure chamber defined by flanges of the inner walls of said mould and

M. means actuated by said steam to evacuate said pressure chamber.

9. An apparatus as claimed in claim 8, further comprising:
means to rotate the mould during the stages of heating and cooling about each of two axes of rotation.

10. An apparatus for manufacturing hollow bodies as claimed in claim 8, comprising:
conduit means between said jacket and a source of heat-exchange fluid;
a source of vacuum in conduit connection with said mould cavity during said heating stage;
a source of a protective gas in circuit connection with the said mould cavity during said cooling stage; and
means to rotate said mould during said heating and cooling stages.

11. An apparatus for manufacturing hollow bodies as claimed in claim 10,
said hollow mould being composed of two sections having airtight abutting rim surfaces;
further comprising:
an airtight chamber, airtightly surrounding said rim surfaces and
source of chamber-vacuum to maintain continuously said chamber from the beginning of the heating stage to the end of the cooling stage at a vacuum pressure lower than that of the interior of said mould.

12. An apparatus for manufacturing hollow bodies as claimed in claim 11,
said source of mould vacuum for the interior of said mould being separated from and independent of said source of said chamber-vacuum.

13. An apparatus for manufacturing hollow bodies as claimed in claim 12, further comprising:
means to heat and to cool said heat-exchange fluid including means to heat and to cool said mould;
automatic control means of the sequence and timing of the operations of said means to heat and to cool of said sources of mould vacuum and of chamber vacuum and of said source of gas first simultaneously to heat said mould and to evacuate said chamber and subsequently to cool said mould and to restore pressure to the said chamber and to introduce said gas into said mould.

14. An apparatus as claimed in claim 8, said means to control variably the pressures comprising:

N. first pressure reducing means for controlling the pressure in the mould cavity during the heating phase to a level below the pressure of the jacket;

O. means to cause the pressure in the mould cavity on transition to the cooling phase at least to approach the pressure of the jacket; and P. a second pressure reducing means operable independently of the said first pressure reducing means to cause said pressure chamber to be maintained, at least during a period extending from the start of the heating stage to the end of the cooling stage at a pressure lower than that occurring in the mould cavity during that period.

15. An apparatus for manufacturing hollow bodies as claimed in claim 14,

Q. said jacket being interconnected by flange means defining an annular cavity disposed within the flange means
the cavity extending substantially parallel to a rim portion of the mould, R. means to seal the cavity against ingress of the atmosphere surrounding the mould, and S. means to connect the cavity to the second pressure reducing means.

16. An apparatus for manufacturing hollow bodies, as claimed in claim 14, the first pressure reducing means being connected by duct means and by a universal joint with the interior of the mould cavity.

17. An apparatus for manufacturing hollow bodies as claimed in claim 16, each mould part comprising a flange, the flange of at least one of the mould parts defining the annular cavity.

18. An apparatus for manufacturing hollow bodies as claimed in claim 17,
wherein said means actuated by steam is a double acting piston slidably mounted in a double acting cylinder having,
a piston rod interconnecting the two pistons;
a first cylinder portion of the cylinder being connected by duct means to the annular cavity, and
the second cylinder portion being connected by further duct means to means for generating steam.

19. An apparatus for manufacturing hollow bodies from thermoplastic material comprising:

A. a hollow double-walled divided mould having an interior mould cavity and a chamber exteriorly of said cavity and defined by mold flanges and an additional sealing member, B. means for applying heated fluid to a jacket surrounding the mould cavity during a heating phase, C. means to apply cooling fluid to the jacket space for cooling the mould during a cooling phase, D. a first vacuum means to provide subatmospheric pressure to the mould cavity, E. a second vacuum means to provide subatmospheric pressure to the exterior chamber independently of said first vacuum means; and F. means for rotating the mould about each of two axes of rotation;

G. means for generating steam using heat of said heated fluid leaving said jacket spaces between walls of said double walled mould, and H. means actuated by said steam to evacuate said chamber.

20. An apparatus for manufacturing hollow bodies as claimed in claim 19,
wherein a second vacuum means is connected with said mould cavity and said second vacuum means is independent of vacuum producing means connected to said pressure chamber.

* * * * *